United States Patent
Nagaya et al.

(10) Patent No.: US 8,982,740 B2
(45) Date of Patent: Mar. 17, 2015

(54) WIRELESS COMMUNICATION DEVICE FOR CALCULATING LEVEL CORRECTION VALUE FOR TRANSMISSION SIGNAL

(71) Applicant: Fujitsu Limited, Kawasaki (JP)

(72) Inventors: Setsuya Nagaya, Sapporo (JP); Shinji Kakizaki, Sapporo (JP); Youji Nakata, Sapporo (JP); Mutsuhito Ota, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 13/718,408

(22) Filed: Dec. 18, 2012

(65) Prior Publication Data
US 2013/0258910 A1    Oct. 3, 2013

(51) Int. Cl.
*H04B 7/005*    (2006.01)
*H04L 5/14*    (2006.01)
*H04B 1/04*    (2006.01)
*H04L 27/36*    (2006.01)
*H04B 17/00*    (2006.01)

(52) U.S. Cl.
CPC .............. *H04L 5/14* (2013.01); *H04B 1/0475* (2013.01); *H04L 27/364* (2013.01); *H04B 17/0012* (2013.01)
USPC ........... 370/278; 370/235; 370/334; 370/219; 455/24; 455/9; 455/115.1

(58) Field of Classification Search
None
See application file for complete search history.

(56) References Cited

U.S. PATENT DOCUMENTS

| 4,275,398 | A | * | 6/1981 | Parker et al. | 342/463 |
| 4,520,508 | A | * | 5/1985 | Reichert, Jr. | 725/125 |
| 4,581,658 | A | * | 4/1986 | Azuma et al. | 386/263 |
| 5,309,429 | A | * | 5/1994 | Fukuda | 370/280 |
| 5,524,285 | A | * | 6/1996 | Wray et al. | 455/126 |
| 6,243,399 | B1 | * | 6/2001 | Kaewell et al. | 370/525 |
| 6,253,060 | B1 | * | 6/2001 | Komara et al. | 455/9 |
| 6,272,329 | B1 | * | 8/2001 | Sawchuk | 455/326 |

(Continued)

FOREIGN PATENT DOCUMENTS

| JP | 2004-235966 | 8/2004 |
| JP | 2006-186690 | 7/2006 |

(Continued)

OTHER PUBLICATIONS

KROA—Office Action of Korean Patent Application 10-2012-153535 mailed May 13, 2014, with Full English translation of the Office Action.

*Primary Examiner* — Ian N Moore
*Assistant Examiner* — Dung B Huynh
(74) *Attorney, Agent, or Firm* — Fujitsu Patent Center

(57) ABSTRACT

In a wireless communication device, in a correction value calculating mode, a control unit flips switches to the "a" sides, a modulation processing unit generates a CW signal as an I channel signal, a DAC converts the digital CW signal into an analog CW signal, an LPF eliminates the high-frequency component from the CW signal, a mixer functions as an up-converter for up-converting the CW signal, a PA amplifies the RF power of the CW signal, a mixer functions as a down-converter for down-converting the CW signal, an ADC converts the analog CW signal into a digital CW signal, a level detecting unit detects the voltage level of the CW signal, a correction value calculating unit calculates a correction value based on the detected voltage level, and a correction value storing unit stores the calculated correction value.

4 Claims, 4 Drawing Sheets

(56) References Cited

U.S. PATENT DOCUMENTS

| | | |
|---|---|---|
| 6,381,286 B1* | 4/2002 | Wilkinson et al. ............ 375/296 |
| 6,408,193 B1* | 6/2002 | Katagishi et al. ............ 455/571 |
| 6,728,224 B1* | 4/2004 | Kakizaki et al. ............ 370/313 |
| 7,107,022 B1* | 9/2006 | Thomas et al. ............ 455/102 |
| 7,542,733 B1* | 6/2009 | Ngan ............................ 455/101 |
| 7,590,082 B2 | 9/2009 | Ogawa |
| 7,634,243 B1* | 12/2009 | Esquivel et al. ............ 455/209 |
| 7,890,095 B2* | 2/2011 | Cho ............................ 455/425 |
| 8,099,058 B1* | 1/2012 | Morris et al. ............ 455/69 |
| 8,660,057 B2* | 2/2014 | Moshfeghi ............ 370/315 |
| 2002/0090917 A1* | 7/2002 | Hirano et al. ............ 455/76 |
| 2003/0067359 A1* | 4/2003 | Darabi et al. ............ 331/46 |
| 2005/0181749 A1* | 8/2005 | Lee ............................ 455/126 |
| 2007/0082617 A1* | 4/2007 | McCallister ............ 455/63.1 |
| 2007/0129031 A1* | 6/2007 | Newton et al. ............ 455/127.2 |
| 2007/0280338 A1* | 12/2007 | Haub et al. ............ 375/222 |
| 2008/0144539 A1* | 6/2008 | Sperlich et al. ............ 370/278 |
| 2008/0176513 A1* | 7/2008 | Braithwaite et al. ............ 455/24 |
| 2009/0160429 A1* | 6/2009 | Hirakoso ............ 324/76.23 |
| 2009/0268784 A1* | 10/2009 | Boehlke et al. ............ 375/133 |
| 2010/0048146 A1* | 2/2010 | McCallister ............ 455/78 |
| 2010/0097152 A1* | 4/2010 | Wang et al. ............ 331/44 |
| 2010/0254441 A1* | 10/2010 | Kenington ............ 375/214 |
| 2010/0298035 A1* | 11/2010 | Beamish et al. ............ 455/571 |
| 2011/0043956 A1* | 2/2011 | Su et al. ............ 361/86 |
| 2011/0070882 A1* | 3/2011 | Cheng et al. ............ 455/424 |
| 2011/0234315 A1* | 9/2011 | Chen et al. ............ 330/149 |
| 2011/0300914 A1* | 12/2011 | Gudem et al. ............ 455/574 |
| 2012/0098713 A1* | 4/2012 | Mow et al. ............ 343/703 |
| 2012/0155287 A1* | 6/2012 | Huang et al. ............ 370/242 |
| 2012/0155572 A1* | 6/2012 | Kim et al. ............ 375/297 |
| 2013/0217339 A1* | 8/2013 | Asuri ............ 455/73 |

FOREIGN PATENT DOCUMENTS

| | | |
|---|---|---|
| JP | 2006-261793 | 9/2006 |
| JP | 2012-039560 | 2/2012 |

* cited by examiner

WIRELESS COMMUNICATION DEVICE FOR CALCULATING LEVEL CORRECTION VALUE FOR TRANSMISSION SIGNAL

CROSS-REFERENCE TO RELATED APPLICATION

This application is based upon and claims the benefit of priority of the prior Japanese Patent Application No. 2012-077825, filed on Mar. 29, 2012, the entire contents of which are incorporated herein by reference.

FIELD

The embodiments discussed herein are directed to a wireless communication device.

BACKGROUND

It is important to secure a stable throughput with the growing needs for a larger data amount and a faster data transmission in these days. In the 3rd Generation Partnership Project Long Term Evolution (3GPP-LTE) that is a new communication scheme for mobile communications, a channel bandwidth is extended up to 20 MHz. Extension of a channel bandwidth tends to increase the in-band ripple deviation (hereinafter, abbreviated as "ripple deviation") inherent in a high-frequency device such as a duplexer. The increase of the ripple deviation causes reduction of the Error Vector Magnitude (EVM) and thus reduces the throughput.

FIG. 1 illustrates an example of frequency characteristics of a duplexer that is used in a wireless communication device mounted on a communication terminal device (hereinafter, abbreviated as "communication terminal") such as a mobile phone. In the example, ripple deviations occur in the transmission bandwidth of 1920 to 1980 MHz. The ripple deviations vary depending on each individual duplexer due to the temperature change, the variation in the elements, the difference of manufacturers, the difference of models even in the same manufacture, or the like. It is difficult to further improve the performance of the duplexer itself in order to reduce the ripple deviations because it increases the production cost.

Conventionally, to reduce the effect of ripple deviations to a transmission signal, a technique for previously correcting the voltage level of the transmission signal before being input to the duplexer with a correction value for negating the ripple deviation (hereinafter, abbreviated as "correction value") has been used. Conventionally, based on the correction values for as many wireless communication devices as possible, the average value of the correction values is stored in the memories of wireless communication devices as the correction value of the individual wireless communication device at the experimental stage of a wireless communication device. Then, when the wireless communication is in a communication state, the correction value stored in the memory corrects the voltage level of the transmission signal.

Related-art examples are described, for example, in Japanese Laid-open Patent Publication No. 2004-235966 and Japanese Laid-open Patent Publication No. 2006-186690.

Because the correction value stored in the memory at the experimental stage of a wireless communication device as described above is a fixed value, it is difficult to follow the temperature change. On the contrary, when the correction values according to the temperatures are stored in the memory in consideration of the temperature change, the storage capacity of the memory becomes large and thus the device scale of the wireless communication device becomes large. Further, in this case, since it is preferable to detect the temperature of the wireless communication device, the device structure of the wireless communication device becomes complicated. Further, because the correction value stored in the memory is conventionally an average value of a plurality of wireless communication devices, it is difficult to completely correct the ripple deviations that are different from each other at each duplexer.

SUMMARY

According to an aspect of an embodiment, a wireless communication device includes an antenna, a duplexer that allows the antenna to be used as both of a transmitting antenna and a receiving antenna, a first mixer that functions as an up-converter, a second mixer that functions as a down-converter in a first mode, and functions as an up-converter in a second mode, a detecting unit that detects a level of a signal that has been up-converted by the first mixer, has passed through the duplexer, and has been down-converted by the second mixer in the first mode, and a calculating unit that calculates a level correction value of a transmission signal based on the detected level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Structure of Wireless Communication Device 10

Figure 2:
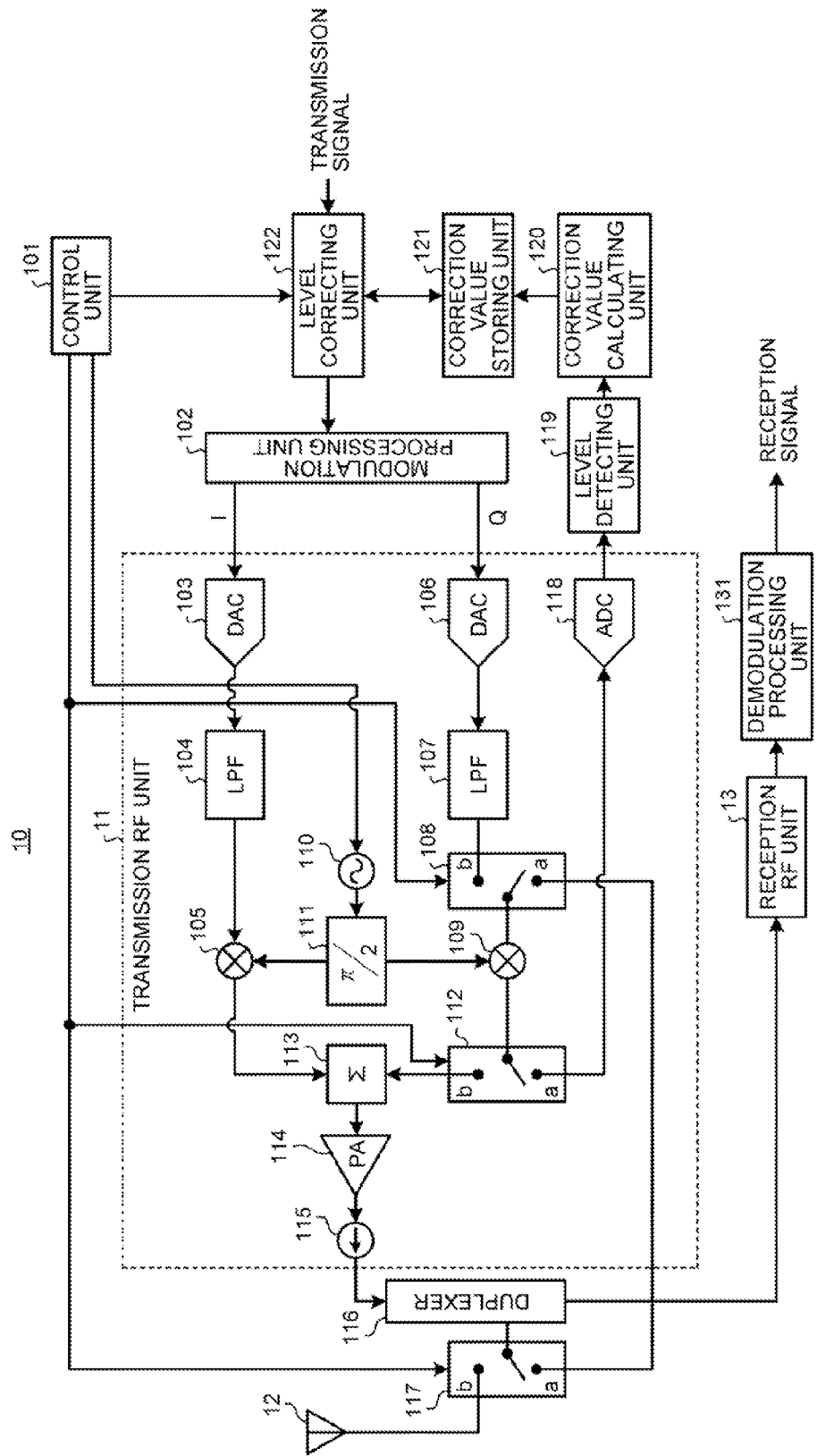
FIG. 2 is a view illustrating an exemplary structure of a wireless communication device according to an embodiment.

FIG. 2 is a view illustrating an exemplary structure of a wireless communication device 10 according to the present embodiment. In FIG. 2, the wireless communication device 10 includes a control unit 101, a modulation processing unit 102, a transmission Radio Frequency (RF) unit 11, a duplexer 116, a switch 117, an antenna 12, a reception Radio Frequency (RF) unit 13, a demodulation processing unit 131, a level detecting unit 119, a correction value calculating unit 120, a correction value storing unit 121, and a level correcting unit 122. Further, the transmission RF unit 11 includes Digital to Analog Converters (DACs) 103 and 106, Low-Pass Filters (LPFs) 104 and 107, a local signal generator 110, a π/2 phase shifter 111, mixers 105 and 109, switches 108 and 112, a combiner 113, a Power Amplifier (PA) 114, an Isolator (ISO) 115, and an Analog to Digital Converter (ADC) 118. Further, the mixers 105 and 109, the local signal generator 110, the π/2 phase shifter 111, and the combiner 113 form a quadrature modulator.

The wireless communication device 10 operates in either of a first mode or a second mode. The first mode is for calculating a correction value for correcting the voltage level of a transmission signal (hereinafter, referred to as the "correction value calculating mode"). The second mode is for transmitting and receiving a signal through an antenna (hereinafter, referred to as the "communication mode"). In the correction value calculating mode, the control unit 101 flips the switches 108, 112, and 117 to the "a" sides. On the other hand, in the communication mode, the control unit 101 flips the switches 108, 112, and 117 to the "b" sides.

Correction Value Calculating Mode

First, the correction value calculating mode will be described.

The control unit 101 flips the switches 108, 112, and 117 to the "a" sides. This connects the duplexer 116 to the mixer 109, and connects the mixer 109 to the ADC 118, so that the wireless communication device 10 gets into a connection state in the correction value calculating mode. The control unit 101 further controls the frequency of a local signal generated by the local signal generator 110. The control unit 101 makes the frequency of the local signal sweep in the transmission bandwidth.

The modulation processing unit 102 generates a Continuous Wave (CW) signal (for example, a sine curve signal of 1 MHz) as an I channel signal and outputs the generated CW signal to the DAC 103. On the other hand, the modulation processing unit 102 does not generate and output a Q channel signal. Thus, in the correction value calculating mode, the DAC 106 and the LPF 107 do not operate, and the signal is input to the combiner 113 only from the mixer 105, and not from the mixer 109.

The DAC 103 converts a digital CW signal into an analog CW signal and outputs the converted CW signal to the LPF 104.

The LPF 104 eliminates the high-frequency component from the CW signal and outputs the CW signal that has only the low-frequency component to the mixer 105.

The local signal generator 110 generates a local signal according to the frequency control from the control unit 101 and outputs the generated local signal to the π/2 phase shifter 111.

The π/2 phase shifter 111 shifts, by π/2, the phase of one of the local signals that are to be output to the mixer 105 and the mixer 109 so that the difference between the phases of the I channel signal and the Q channel signal becomes π/2. For example, the π/2 phase shifter 111 shifts, by π/2, only the phase of the local signal that is to be output to the mixer 109 in order to make the difference between the phases of the I channel signal and the Q channel signal π/2.

The mixer 105 mixes the CW signal input from the LPF 104 with the local signal input from the π/2 phase shifter 111. This gets a CW signal up-converted by the local signal and a CW signal down-converted by the local signal, and the CW signals are output to the combiner 113.

Here, the PA 114, the ISO 115, and the duplexer 116 are elements that work for high-frequency signals and do not work for low-frequency signals. Thus, the PA 114, the ISO 115, and the duplexer 116 work only for the up-converted CW signal among the CW signals obtained by the mixer 105. In other words, in the wireless communication device 10, the mixer 105 functions as an up-converter. Further, the mixer 105 functions as an up-converter in both of the correction value calculating mode and the communication mode.

The CW signal that has been input to the combiner 113 is input to the PA 114 through the combiner 113.

The PA 114 amplifies the Radio Frequency (RF) power of the CW signal and outputs the power-amplified CW signal to the ISO 115. The power-amplified CW signal is input to the mixer 109 through the ISO 115, the duplexer 116, the switch 117, and the switch 108.

The mixer 109 mixes the CW signal that is output from the PA 114 and is input through the ISO 115, the duplexer 116, the switch 117, and the switch 108 with the CW signal that is input from the π/2 phase shifter 111. Accordingly, a CW signal up-converted by the local signal and a CW signal down-converted by the local signal are obtained, and these CW signals are output to the ADC 118 through the switch 112.

Here, the ADC 118 is an element that works for low-frequency signals and does not work for high-frequency signals. Thus, the ADC 118 works only for the down-converted CW signal among the CW signals obtained by the mixer 109. In other words, in the correction value calculating mode, the mixer 109 functions as a down-converter in the wireless communication device 10.

The ADC 118 converts an analog CW signal into a digital CW signal and outputs the converted CW signal to the level detecting unit 119.

Figure 1:
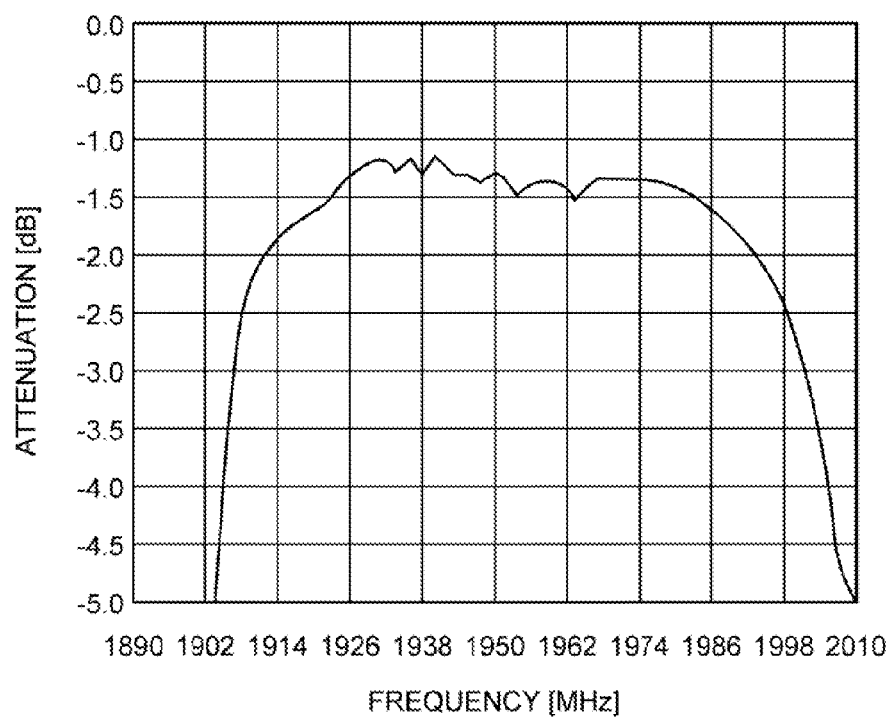
FIG. 1 is a view illustrating an example of frequency characteristics of a duplexer.

Here, because the signal input to the level detecting unit 119 has been input through the duplexer 116, the signal becomes a CW signal having the ripple deviations as illustrated in FIG. 1.

The level detecting unit 119 detects the voltage level of the input CW signal and outputs the detection result to the correction value calculating unit 120. In other words, the level detecting unit 119 detects the voltage level of the CW signal that has been up-converted in the mixer 105, has passed through the duplexer 116, and then has been down-converted in the mixer 109.

The correction value calculating unit 120 calculates a correction value based on the voltage level detected in the level detecting unit 119, and stores the calculated correction value in the correction value storing unit 121.

In the correction value calculating mode, the control unit 101 sequentially shifts the frequency of the local signal generator 110 at predetermined frequency intervals in order to perform the above-mentioned series of processes. In other words, the mixer 105 and the mixer 109 operate according to the local signal whose frequency is sequentially shifted at predetermined frequency intervals. Accordingly, a plurality of the correction values for the ripple deviations at a plurality of frequency points are stored in the correction value storing unit 121.

The correction value calculating unit 120 calculates, as the correction value, the difference "Vn−Vc" between a voltage level (reference level) Vc of a predetermined reference frequency C in the transmission bandwidth and a voltage level Vn at a target frequency n in the transmission bandwidth. The target frequency n is a frequency to be targeted for the calculation of correction value. The target frequencies n are a plurality of frequency points in the transmission bandwidth, and correspond to, for example, some of frequency points from 1920 to 1980 MHz in the example illustrated in FIG. 1. Note that, the correction value calculating unit 120 may also calculate "Vc−Vn" as the correction value.

Communication Mode

Next, the communication mode will be described.

The control unit 101 flips the switches 108, 112, and 117 to the "b" sides. This connects the LPF 107 to the mixer 109, connects the mixer 109 to the combiner 113, and connects the duplexer 116 and the antenna 12, so that the wireless communication device 10 gets into a connection state in the communication mode. The control unit 101 further controls the frequency of the local signal generated by the local signal generator 110. The control unit 101 sets one of the frequencies used for a communication in the transmission bandwidth as the frequency of the local signal. The control unit 101 further outputs a signal indicating the frequency of the local signal (or, namely, a signal indicating the transmission frequency) to the level correcting unit 122.

The level correcting unit 122 corrects the voltage level of the input transmission signal using the correction value stored in the correction value storing unit 121 in order to output the corrected transmission signal to the modulation processing unit 102. The level correcting unit 122 adds, to the voltage level of the transmission signal, the correction value "Vn−Vc" corresponding to the transmission frequency n indicated by the control unit 101 in order to correct the voltage level of the transmission signal. Note that, when the correction value calculating unit 120 calculates the "Vc−Vn" as the correction value, the level correcting unit 122 subtracts the correction value "Vc−Vn" from the voltage level of the transmission signal in order to correct the voltage level of the transmission signal. As described above, using the correction value, previously correcting the voltage level of the transmission signal before being input to the duplexer 116 negates the ripple deviation of the transmission signal when the transmission signal passes through the duplexer 116.

The modulation processing unit 102 modulates the transmission signal after the level has been corrected in order to generate an I channel signal and a Q channel signal. The modulation processing unit 102 outputs the I channel signal to the DAC 103, and outputs the Q channel signal to the DAC 106.

The DAC 103 converts the digital I channel signal into the analog I channel signal and outputs the converted I channel signal to the LPF 104.

The LPF 104 eliminates the high-frequency component from the I channel signal in order to output the I channel signal that has only the low-frequency component to the mixer 105.

The DAC 106 converts the digital Q channel signal into the analog Q channel signal and outputs the converted Q channel signal to the LPF 107.

The LPF 107 eliminates the high-frequency component from the Q channel signal in order to output the Q channel signal that has only the low-frequency component to the mixer 109 through the switch 108.

The local signal generator 110 generates the local signal having the frequency set by the control unit 101 in order to output the generated local signal to the π/2 phase shifter 111.

The mixer 105 mixes the I channel signal input from the LPF 104 with the local signal input from the π/2 phase shifter 111. Accordingly, an I channel signal up-converted by the local signal and an I channel signal down-converted by the local signal are obtained, and the I channel signals are output to the combiner 113.

Here, the mixer 105 functions as an up-converter in both of the correction value calculating mode and the communication mode as described above.

On the other hand, the mixer 109 mixes the Q channel signal input from the LPF 107 with the local signal input from the π/2 phase shifter 111. Accordingly, a Q channel signal up-converted by the local signal and a Q channel signal down-converted by the local signal are obtained, and the Q channel signals are output to the combiner 113 through the switch 112.

Here, as described above, the PA 114, the ISO 115, and the duplexer 116 are elements that work for high-frequency signals and do not work for low-frequency signals. Thus, the PA 114, the ISO 115, and the duplexer 116 work only for the up-converted Q channel signal among the Q channel signals obtained by the mixer 109. In other words, in the communication mode, the mixer 109 functions as an up-converter in the wireless communication device 10.

The phase of the I channel signal output from the mixer 105 differs from the phase of the Q channel signal output from the mixer 109 by π/2.

The combiner 113 combines the I channel signal and the Q channel signal in order to generate a combined signal and outputs the generated combined signal to the PA 114.

The PA 114 amplifies the RF power of the combined signal in order to output the power-amplified combined signal to the ISO 115. The power-amplified combined signal is transmitted from the wireless communication device 10 through the ISO 115, the duplexer 116, the switch 117, and the antenna 12.

On the other hand, the signal that has been received through the antenna 12, the switch 117, and the duplexer 116 is input to the reception RF unit 13.

In other words, the duplexer 116 is for using the antenna 12 as both of a transmitting antenna and a receiving antenna.

The reception RF unit 13 performs a receiving process including a down-conversion and an A/D conversion on the input analog received signal in order to output the digital received signal after the receiving process to the demodulation processing unit 131.

The demodulation processing unit 131 demodulates the digital received signal in order to output the demodulated received signal.

Operations of the Wireless Communication Device 10

Figure 3:
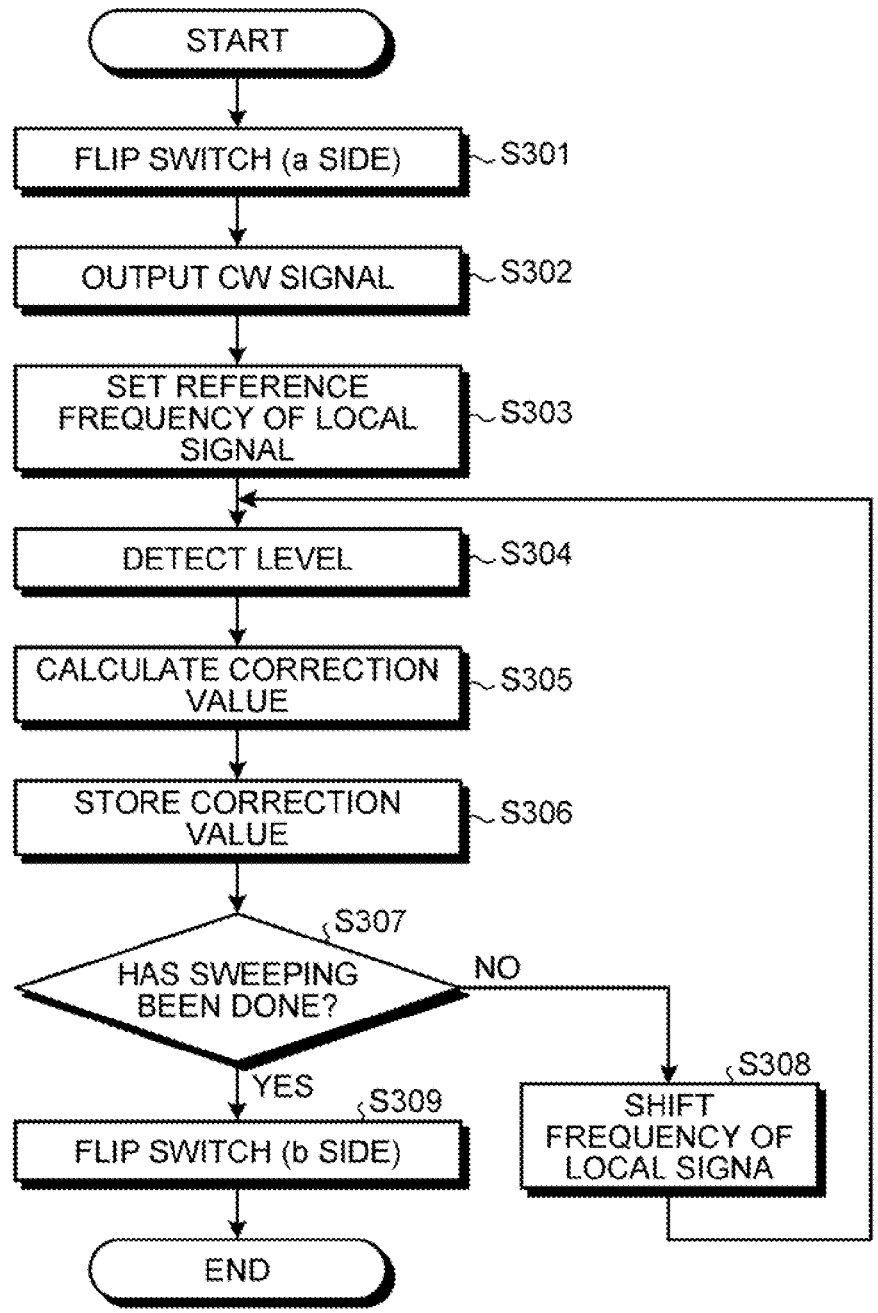
FIG. 3 is a flowchart for describing the operations of the wireless communication device according to the embodiment.

FIG. 3 is a flowchart for describing the operations of the wireless communication device 10 according to the present embodiment.

First, the control unit 101 flips the switches 108, 112, and 117 to the "a" sides (step S301). This leads the wireless communication device 10 into a connection state in the correction value calculating mode.

Next, the modulation processing unit 102 outputs a CW signal as an I channel signal (step S302).

Next, the control unit 101 sets the reference frequency C of the local signal at the local signal generator 110 (step S303). The reference frequency C is preferably set as the central frequency in the transmission bandwidth. For example, when the duplexer 116 has the frequency characteristic illustrated in FIG. 1, the reference frequency C is preferably set at 1950 MHz that is the central frequency of the transmission bandwidth from 1920 to 1980 MHz.

Here, the loop process including steps S304 to S308 is repeated more than once.

In other words, at the first loop process, the level detecting unit 119 detects the voltage level (reference level) Vc of the CW signal at the reference frequency C (step S304).

Next, the correction value calculating unit 120 calculates the correction value (step S305), and stores the calculated correction value in the correction value storing unit 121 (step S306). Because of Vc=Vn at the first loop process, the correction value at the reference frequency C is zero. Further, at the first loop process, the correction value calculating unit 120 maintains the reference level Vc.

Next, the control unit 101 determines whether all of the target frequencies n in the transmission bandwidth have been swept or, in other words, whether the correction values have been calculated throughout the transmission bandwidth (step S307). The number of the target frequencies n is determined by the shift interval of the frequencies of the local signal. In other words, the smaller the shift interval of the frequencies is, the more the number of the target frequencies n is. Thus, the correction accuracy of the ripple deviation becomes high. For example, the shift interval of the frequencies is capable of being set at 100 kHz.

When all of the target frequencies n in the transmission bandwidth have not been swept (step S307: No), the control unit 101 shifts the frequency of the local signal by a predetermined amount in order to set new target frequency n (step S308).

Then, the process goes back to step S304 from step S308 in order to conduct the second and subsequent loop processes.

At the second and subsequent loop processes, the level detecting unit 119 detects the voltage level Vn of the CW signal at the target frequency n (step S304).

Next, the correction value calculating unit 120 calculates the correction value "Vn–Vc" (or, the correction value "Vc–Vn") (step S305) in order to store the calculated correction value in the correction value storing unit 121 (step S306).

Next, the control unit 101 determines whether all of the target frequencies n in the transmission bandwidth have been swept or, in other words, whether the correction values have been calculated throughout the transmission bandwidth (step S307).

When all of the target frequencies n in the transmission bandwidth have been swept (step S307: Yes), the control unit 101 flips the switches 108, 112, and 117 to the "b" sides (step S309). This leads the wireless communication device 10 into a connection state in the communication mode.

After that, the process described in the above-mentioned item "Communication mode" is conducted.

In the present embodiment as described above, in the wireless communication device 10, while the mixer 105 functions as an up-converter in both of the correction value calculating mode and the communication mode, the mixer 109 functions as a down-converter in the correction value calculating mode and functions as an up-converter in the communication mode. Further, the level detecting unit 119 detects the voltage level of the CW signal that has been up-converted by the mixer 105, has passed through the duplexer 116, and has been down-converted by the mixer 109 in the correction value calculating mode. The correction value calculating unit 120 calculates the voltage level correction value of the transmission signal based on the detected voltage level.

This can properly update the correction value even after the beginning of use of a wireless communication device by setting the wireless communication device at the correction value calculating mode, so that the correction value can be kept appropriate. For example, the correction value is updated every time the temperature changes so that the correction value can follow the temperature change. Thus, according to the present embodiment, even if the temperature has changed, the ripple deviation can accurately be corrected.

Further, according to the present embodiment, because the correction value can be updated every time the temperature changes, it is not necessary for the wireless communication device 10 to previously store the correction value corresponded to each temperature. Further, according to the present embodiment, the correction value is calculated using the mixer 105 and the mixer 109 that have originally been provided in the wireless communication device 10 for a wireless communication. Further, according to the present embodiment, the mixer 109 that has originally been used as only an up-converter also functions as a down-converter using a simple structure in which a switch is flipped. Thus, according to the present embodiment, the ripple deviation can be corrected with a simple structure while the increase of the device scale is prevented.

In other words, according to the present embodiment, the ripple deviation can accurately be corrected with a simple structure while the increase of the device scale is prevented.

Further, according to the present embodiment, the mixer 105 and the mixer 109 operate according to the local signal whose frequency is sequentially shifted at predetermined frequency intervals. This can calculate the correction value corresponding to each frequency while sweeping is performed at the predetermined frequency intervals in the transmission bandwidth. Thus, according to the present embodiment, the ripple deviations can accurately be corrected throughout the transmission bandwidth.

Note that, when the signal transmitted from the wireless communication device 10 is a multicarrier signal such as an Orthogonal Frequency-Division Multiplexing (OFDM) signal, it is preferable to shift the frequency of the local signal at subcarrier intervals of a plurality of subcarriers included in the multicarrier signal. The correction value at each subcarrier can be obtained so that the ripple deviation can be corrected at each subcarrier. Thus, the ripple deviations can accurately be corrected in a multicarrier signal. When the signal transmitted from the wireless communication device 10 is an OFDM signal, an Inverse Fast Fourier Transform (IFFT) process is further performed on the level-corrected transmission signal in the modulation processing unit 102.

Further, it is preferable to perform the correction value calculating mode when the wireless communication device 10 is not in a communication state, for example, (1) during the initial setup from the activation of the wireless communication device 10 until the wireless communication device 10 becomes available to communicate, (2) when the wireless communication device 10 is in a standby state, and (3) when the wireless communication device 10 is in a Compressed Mode, in addition to the time at the factory shipment of the wireless communication device 10. This can calculate the correction value without interrupting the data communication of the wireless communication device 10.

Further, the ADC that has originally been provided in the wireless communication device 10 for the RF power detection for an Auto Power Control (APC) of the PA 114 is capable of being used as the ADC 118. This can further prevent the increase of the device scale of the wireless communication device 10.

Further, according to the present embodiment, the mixer 109 that functions as the up-converter for the Q channel signal in the communication mode functions as the down-converter for the CW signal in the correction value calculating mode. The mixer 105 that functions as the up-converter for the I channel signal in the communication mode, however, may function as the down-converter for the CW signal in the correction value calculating mode. In that case, the switch 108 and the switch 112 are provided at both sides of the mixer 105, and the modulation processing unit 102 may generate a CW signal as a Q channel signal in the correction value calculating mode. In other words, either of two mixers may be used as a down-converter in the correction value calculating mode.

Hardware Configuration of the Wireless Communication Device 10

The above-mentioned wireless communication device 10 is capable of being implemented by the hardware configuration described below.

Figure 4:
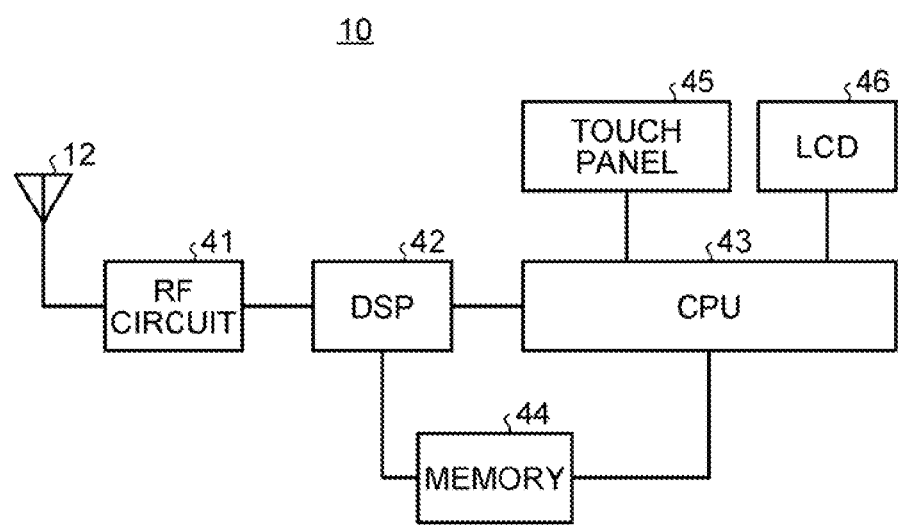
FIG. 4 is a view illustrating an exemplary hardware configuration of the wireless communication device.

FIG. 4 is a view for illustrating an exemplary hardware configuration of the wireless communication device 10. As illustrated in FIG. 4, as for the hardware, the wireless communication device 10 includes the antenna 12, a Radio Frequency (RF) circuit 41, a Digital Signal Processor (DSP) 42, a Central Processing Unit (CPU) 43, a memory 44, a touch panel 45, and a Liquid Crystal Display (LCD) 46.

The transmission RF unit 11, the duplexer 116, the switch 117, and the reception RF unit 13 illustrated in FIG. 2 are implemented by the RF circuit 41. Further, the modulation processing unit 102, the level detecting unit 119, the correction value calculating unit 120, the level correcting unit 122, and the demodulation processing unit 131 illustrated in FIG. 2 are implemented by the DSP 42. Further, the control unit 101 illustrated in FIG. 2 is implemented by the CPU 43. Further, the correction value storing unit 121 illustrated in FIG. 2 is implemented by the memory 44.

Hereinabove, the embodiments of the present invention have been described.

Note that, the above-mentioned wireless communication device 10 is suitable for a communication terminal.

According to the above-mentioned embodiment of the wireless communication device disclosed in the present invention, a ripple deviation can accurately be corrected with a simple structure while the increase of the device scale is prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device comprising:
   an antenna;
   a duplexer that allows the antenna to be used as both of a transmitting antenna and a receiving antenna, the duplexer having a ripple deviation;
   a first mixer that is connected to the duplexer and functions as an up-converter in both a first mode and a second mode;
   a second mixer that is connected to the duplexer through a switch, the switch being capable of being flipped to a first side or a second side, that changes a function thereof according to a flip of the switch, that functions as a down-converter for a first signal in the first mode, the first mode being a mode in which the switch is flipped to the first side, the first signal being a signal which has output from the duplexer after having been up-converted by the first mixer, and that functions as an up-converter for a second signal in the second mode, the second mode being a mode in which the switch is flipped to the second side, the second signal being a signal before being input to the duplexer;
   a detecting unit that detects a level of a third signal that has been up-converted by the first mixer, has passed through the duplexer, and has been down-converted by the second mixer in the first mode; and
   a calculating unit that calculates a level correction value of a transmission signal based on the detected level, the level correction value being for negating the ripple deviation of the duplexer.

2. The wireless communication device according to claim 1, wherein the first mixer and the second mixer operate according to a local signal whose frequency is sequentially shifted at predetermined frequency intervals throughout a transmission bandwidth in the first mode.

3. The wireless communication device according to claim 2, wherein the predetermined frequency intervals are subcarrier intervals of a plurality of subcarriers included in a multicarrier signal.

4. The wireless communication device according to claim 1, wherein the calculating unit calculates the level correction value when the wireless communication device is not in a communication state.

* * * * *

UNITED STATES PATENT AND TRADEMARK OFFICE
CERTIFICATE OF CORRECTION

PATENT NO. : 8,982,740 B2  
APPLICATION NO. : 13/718408  
DATED : March 17, 2015  
INVENTOR(S) : Setsuya Nagaya et al.

Page 1 of 1

It is certified that error appears in the above-identified patent and that said Letters Patent is hereby corrected as shown below:

Title page

The Foreign Application Priority Data should be added as shown below:

-- Item (30)    Foreign Application Priority Data

Mar. 29, 2012   (JP).......................2012-077825 --

Signed and Sealed this
Eleventh Day of August, 2015

Michelle K. Lee
*Director of the United States Patent and Trademark Office*